United States Patent
Aude et al.

(10) Patent No.: US 8,476,934 B2
(45) Date of Patent: Jul. 2, 2013

(54) CIRCUITRY AND METHOD FOR DIFFERENTIAL SIGNAL DETECTION WITH INTEGRATED REFERENCE VOLTAGE

(75) Inventors: Arlo J. Aude, Atlanta, GA (US); Soumya Chandramouli, Atlanta, GA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 13/188,243

(22) Filed: Jul. 21, 2011

(65) Prior Publication Data

US 2013/0021081 A1  Jan. 24, 2013

(51) Int. Cl.
*H03K 5/22*  (2006.01)

(52) U.S. Cl.
USPC ............. 327/63; 327/64; 327/65; 327/66

(58) Field of Classification Search
USPC ................................. 327/63, 65, 66
See application file for complete search history.

(56) References Cited

U.S. PATENT DOCUMENTS

| | | | |
|---|---|---|---|
| 6,448,806 B1 | 9/2002 | Roth | |
| 6,803,795 B2 * | 10/2004 | Nakajima et al. | 327/67 |
| 7,808,282 B2 | 10/2010 | Cheung | |
| 2004/0151506 A1 | 8/2004 | Shiramizu et al. | |
| 2008/0143441 A1 | 6/2008 | Naito | |

* cited by examiner

*Primary Examiner* — John Poos
(74) *Attorney, Agent, or Firm* — Andrew S. Viger; Wade J. Brady, III; Frederick J. Telecky, Jr.

(57) ABSTRACT

Differential signal detection circuitry with an integrated reference voltage. The reference voltage is added as an offset to the output voltage, and its integration ensures that variations in the reference voltage closely track variations in the signal. Accordingly, the detection threshold for the signal being detected remains more consistent over variations in the circuit manufacturing process, power supply voltage and operating temperature.

14 Claims, 9 Drawing Sheets

$VID = vinp - vinn$ $outp = vinp - vbe$ $vcm = \dfrac{vinp + vinn}{2}$

VALID WHEN VID IS LARGE ENOUGH TO COMPLETELY SWITCH I $outn = vcm - vbe = \dfrac{vinp + vinn}{2} - vbe$ $outp - outn = vinp - vbe - \left(\dfrac{vinp + vinn}{2} - vbe\right) = \dfrac{vinp - vinn}{2} = \dfrac{VID}{2}$

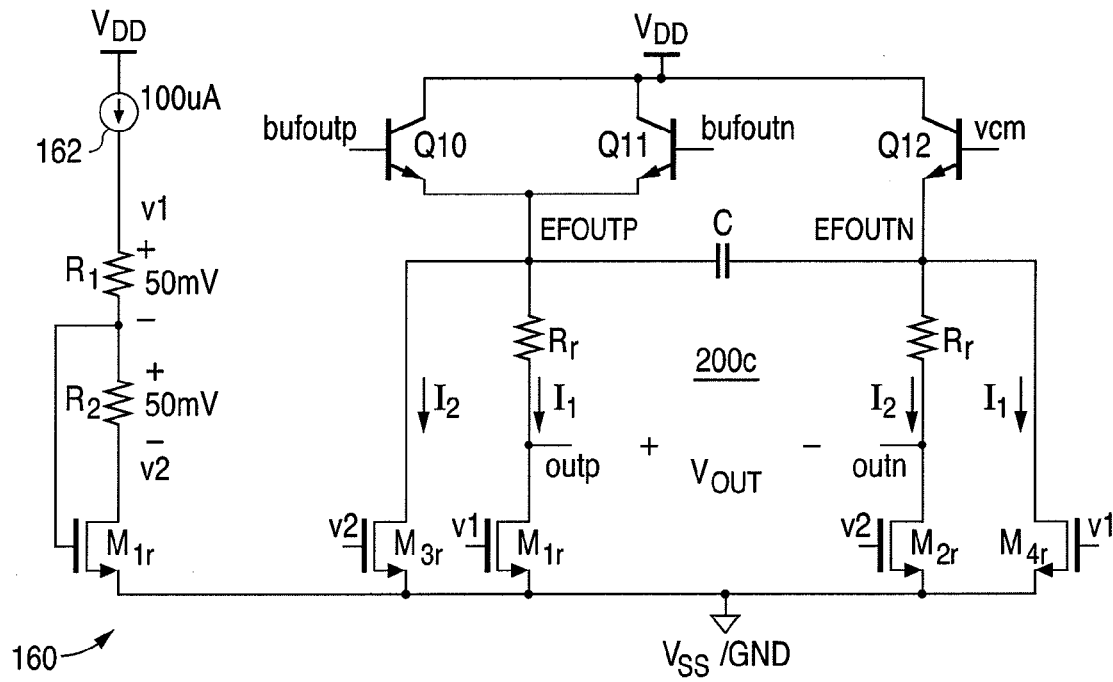

$$I_1 = \frac{1}{2} K \frac{W}{L} (v_{gs} + 0.05 - V_t)^2, \quad I_2 = \frac{1}{2} K \frac{W}{L} (v_{gs} - 0.05 - V_t)^2$$

$$(I_2 - I_1) = \frac{1}{2} K \frac{W}{L} \left[ (Vdsat^2 - 0.05) - (Vdsat + 0.05)^2 \right]$$

$$(I_2 - I_1) = \frac{1}{2} K \frac{W}{L} \begin{bmatrix} Vdsat^2 - (0.1 \times Vdsat) + 0.05^2 - \\ Vdsat^2 - (0.1 \times Vdsat) - 0.05^2 \end{bmatrix}$$

$$(I_2 - I_1) = \frac{1}{2} K \frac{W}{L} \left[ -0.2 \times Vdsat \right]$$

$$(I_2 - I_1) = -0.1 \times K \frac{W}{L} \times Vdsat$$

$$(I_2 - I_1) = -0.1 \times g_m$$

$$\boxed{Vout = (I_2 - I_1) \times R_r = -0.1 \times g_m \times R_r}$$

FIG. 7

CIRCUITRY AND METHOD FOR DIFFERENTIAL SIGNAL DETECTION WITH INTEGRATED REFERENCE VOLTAGE

BACKGROUND

1. Field of the Invention

The present invention relates to differential signal circuits, and in particular, to circuits and methods for detecting differential signals with compensation for variations in circuit manufacturing processes, power supply voltage and operating temperature.

2. Related Art

Many systems, particularly differential signal systems, need to detect the amplitude of the input signal and compare it to the reference signal. By determining if the amplitude of the input signal is greater than or less than the predetermined reference, it can be determined whether an input signal is present. If no signal is present, remaining portions of the system can be idled or shut down to save power. Further, certain circuit operations need only be started upon detection of an input signal.

As is well-known in the art, and discussed in more detail below, the basic stages of subject signal detection circuit are an input stage, a rectification stage (also discussed hereinbelow as a detection stage), a reference voltage generator stage and a comparator stage. The comparator compares the output of the rectification stage to the predetermined reference, e.g., a reference voltage. The input signal magnitude causing the comparator to change its output signal state is the trip point of the system and should, typically, equal the input signal magnitude sought to be detected.

As is well-known, the output signal of the rectification stage and a reference voltage generator stage will vary over process (e.g., manufacturing process), power supply voltage and temperature (PVT). Additionally, the input stage often shows significant performance variations over PVT, and a significant contributor to these variations is the transconductance of the input stage devices. Accordingly, to correctly determine if the input signal is greater or less than the reference, the signal path (e.g., the input and rectification stages) and reference voltage generator stage need to track one another in order to minimize variations in the trip point as over PVT varies.

One conventional technique to achieve such tracking has been done by sending the reference signals through a dummy signal path implemented as a replica of the input and rectification stages so that the input signal and reference signal see the same path. However, this consumes additional circuit area and power.

Referring to FIG. 1, one example of a conventional rectification stage 10 can be implemented as shown. The differential input signal phases VINP, VINN are applied to the differential input amplifier formed by bipolar junction transistors Q1, Q2. Another transistor Q3 is part of a common mode circuit implemented as a voltage follower circuit driven by a common mode voltage VCM (discussed in more detail below). Current sources 12, 14 provide equal biasing currents I. This results in load currents I1, I2 being conducted by the load resistances RL, producing the positive OUTP and negative OUTN phases of the differential output signal. The rectification occurs due to the difference in voltages at the transistor emitters and the taking of the output at the collector electrodes. A difference current I3 between the two circuit branches causes a voltage difference between the mutually connected emitters of the differential amplifier transistors Q1, Q2 and the voltage follower transistor Q3. This voltage difference changes with the differential input voltage VID (=VINP−VINN), thereby causing the transistors Q1, Q2, Q3 to operate with different emitter currents. This adds to the non-linear operation of the emitter follower circuit operation. Additionally, the output signal range is limited by the available range of output voltage across the load resistance RL.

BRIEF DESCRIPTION OF THE DRAWINGS

FIG. 7 is a schematic diagram of differential signal detection circuitry with an integrated reference voltage in accordance with another embodiment of the presently claimed invention and its corresponding equations describing its operation.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, to the extent that the figures illustrate diagrams of the functional blocks of various embodiments, the functional blocks are not necessarily indicative of the division between hardware circuitry. Thus, for example, one or more of the functional blocks may be implemented in a single piece of hardware.

Figure 1:
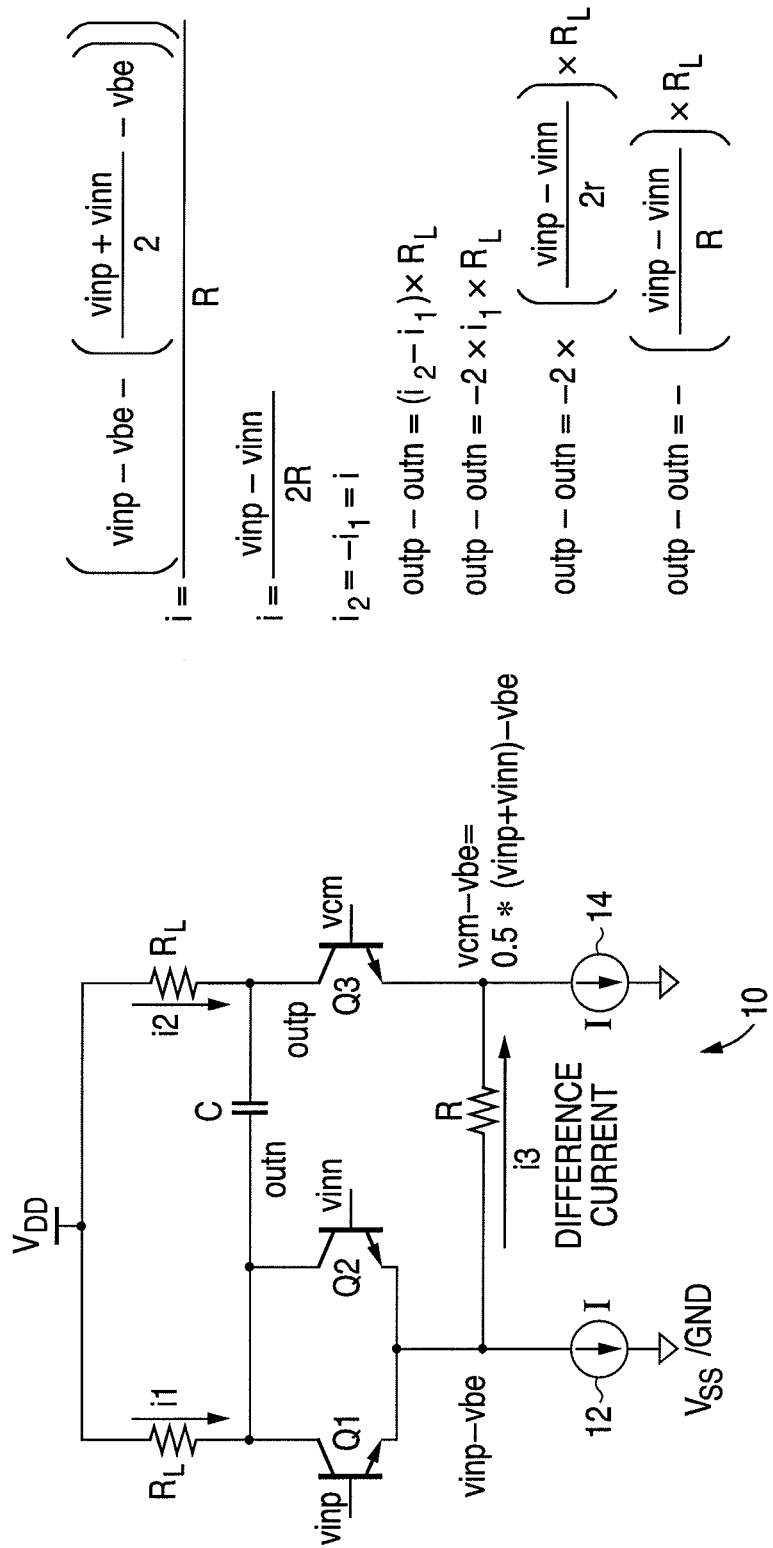
FIG. 1 is a schematic diagram of a conventional differential signal detection circuit and its corresponding equations describing its operation.
Figure 2:
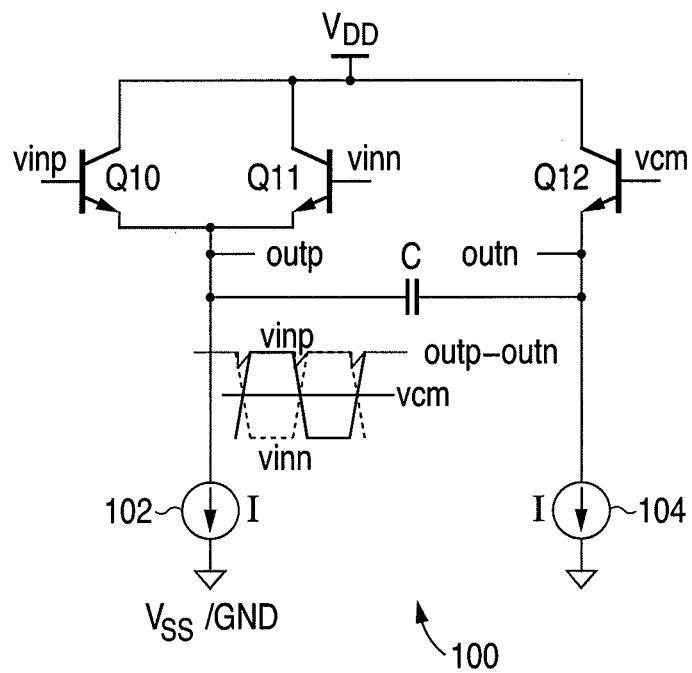
FIG. 2 is a schematic diagram of an improved differential signal detection circuit and its corresponding equations describing its operation.

Referring to FIG. 2, an exemplary embodiment 100 of improved differential signal detection circuitry avoids the use of the load resistances RL and difference resistance R (FIG. 1), and takes the output voltage signal OUTP–OUTN at the emitter electrodes. During transient signal operation, the base-emitter voltages VBE of the input transistors Q10, Q11 and common mode transistor Q12 will be equal for equal currents I from the current sources 102, 104. As indicated by the equations, the output voltage OUTP–OUTN is half of the input voltage VID/2, and is linear over the range of input voltage.

Figure 3:
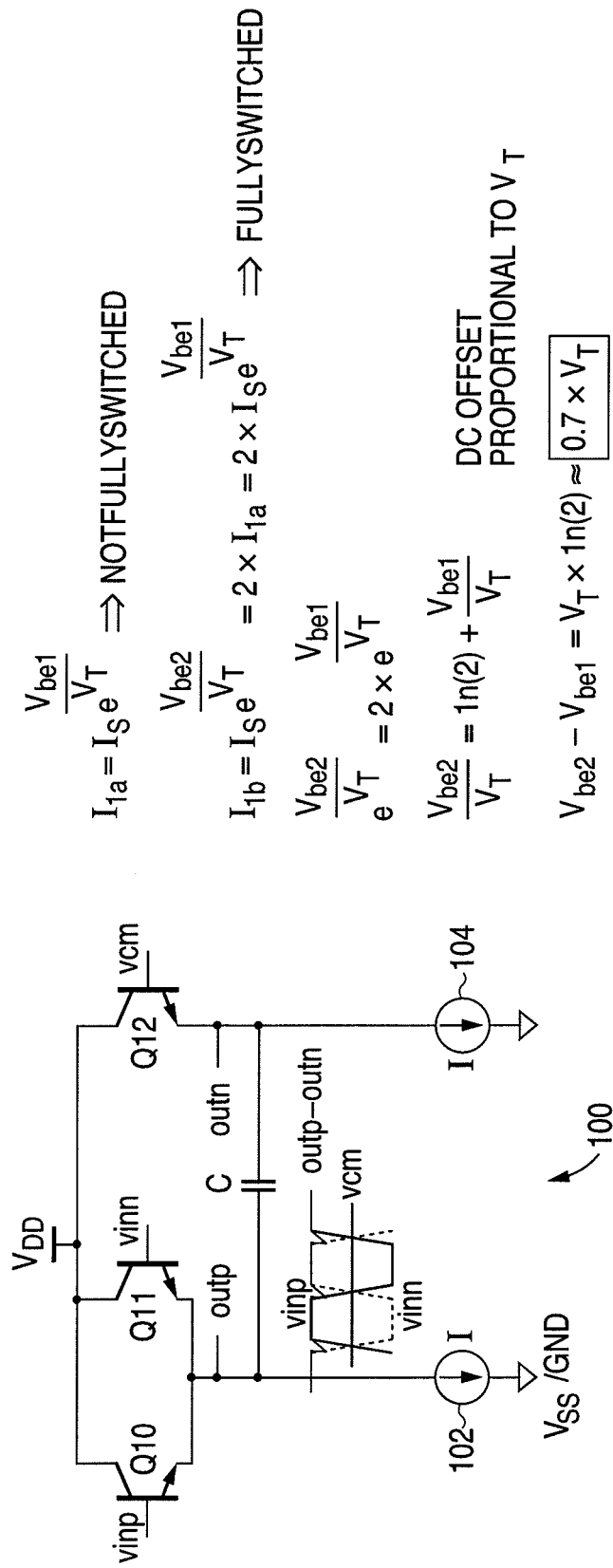
FIG. 3 depicts the circuit of FIG. 2 and its corresponding equations describing its dependency on operating temperature.

Referring to FIG. 3, notwithstanding its improved performance otherwise, this differential signal detection circuitry 100 has an offset voltage VBE2–VBE1, i.e., a difference between the base-emitter voltages of the input transistors Q10, Q11 and the common mode transistor Q12, that is proportional to the transistor threshold voltage VT, which is dependent upon temperature.

Figure 4:
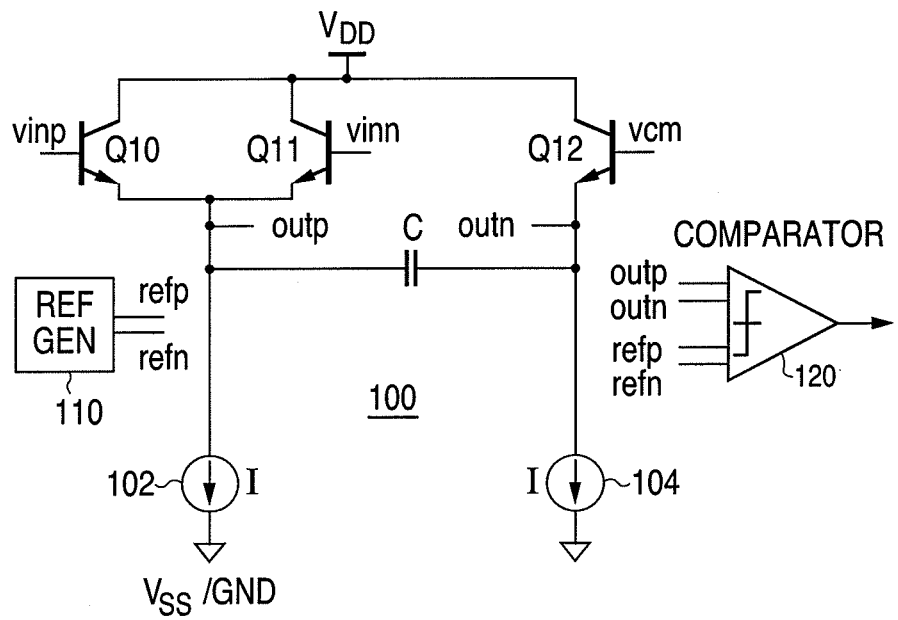
FIG. 4 depicts the circuit of FIG. 2 along with its requirement of an external reference voltage stage for driving a comparator stage.

Referring to FIG. 4, and as discussed above, the differential output signal phases OUTP, OUTN must be compared to corresponding phases REFP, REFN of a differential reference voltage. An external reference generator 110 provides this reference voltage, which is used by a differential voltage comparator 120 to determine when the differential output signal OUTP–OUTN has transcended the voltage threshold represented by the differential reference voltage REFP–RUN. However, since the reference generator 110 is external, i.e., not an integral part of the detection circuitry 100, its performance, in terms of consistency of the reference voltage, will vary with PVT in a manner substantially unrelated to the effects the PVT variations on the differential output signal OUTP–OUTN. Accordingly, the trip point of the voltage comparator 120 will also vary with PVT variations.

Figure 5:
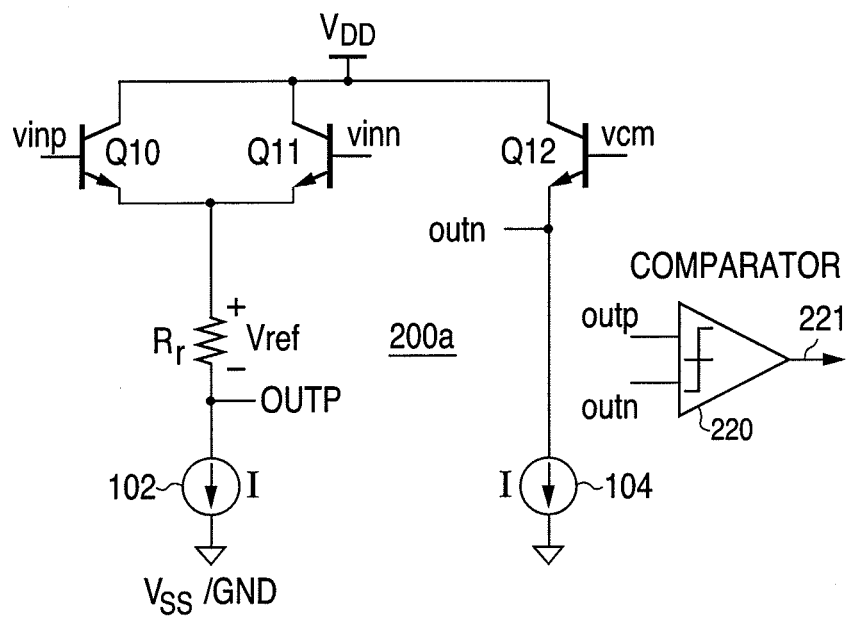
FIG. 5 is a schematic diagram of differential signal detection circuitry with an integrated reference voltage in accordance with one embodiment of the presently claimed invention.

Referring to FIG. 5, in accordance with one embodiment of the presently claimed invention, detection circuitry 200a implements an integrated reference generator in the form of a resistance Rr across which an internal reference voltage Vref is generated in accordance with the current I provided by the current source 102 biasing the differential amplifier transistors Q10, Q11. The positive phase OUTP of the differential output signal is taken from between this resistance Rr and its current source 102, while the negative phase OUTN is taken from the emitter electrode of the common mode transistor Q 12. As a result, when YID<Vref and OUTN>OUTP, the output 221 of the comparator 220 is low, and when VID>=VREF and OUTP>=OUTN, the comparator trips and the output 221 is high.

This addition of an internal reference generator adds an offset to the output voltage, and advantageously eliminates the need for an external reference generator 110 and four-input voltage comparator 120 (FIG. 4). However, compensation to ensure that the reference voltage VREF tracks the input signal amplitude VID over PVT variations would still be desirable.

Figure 6:
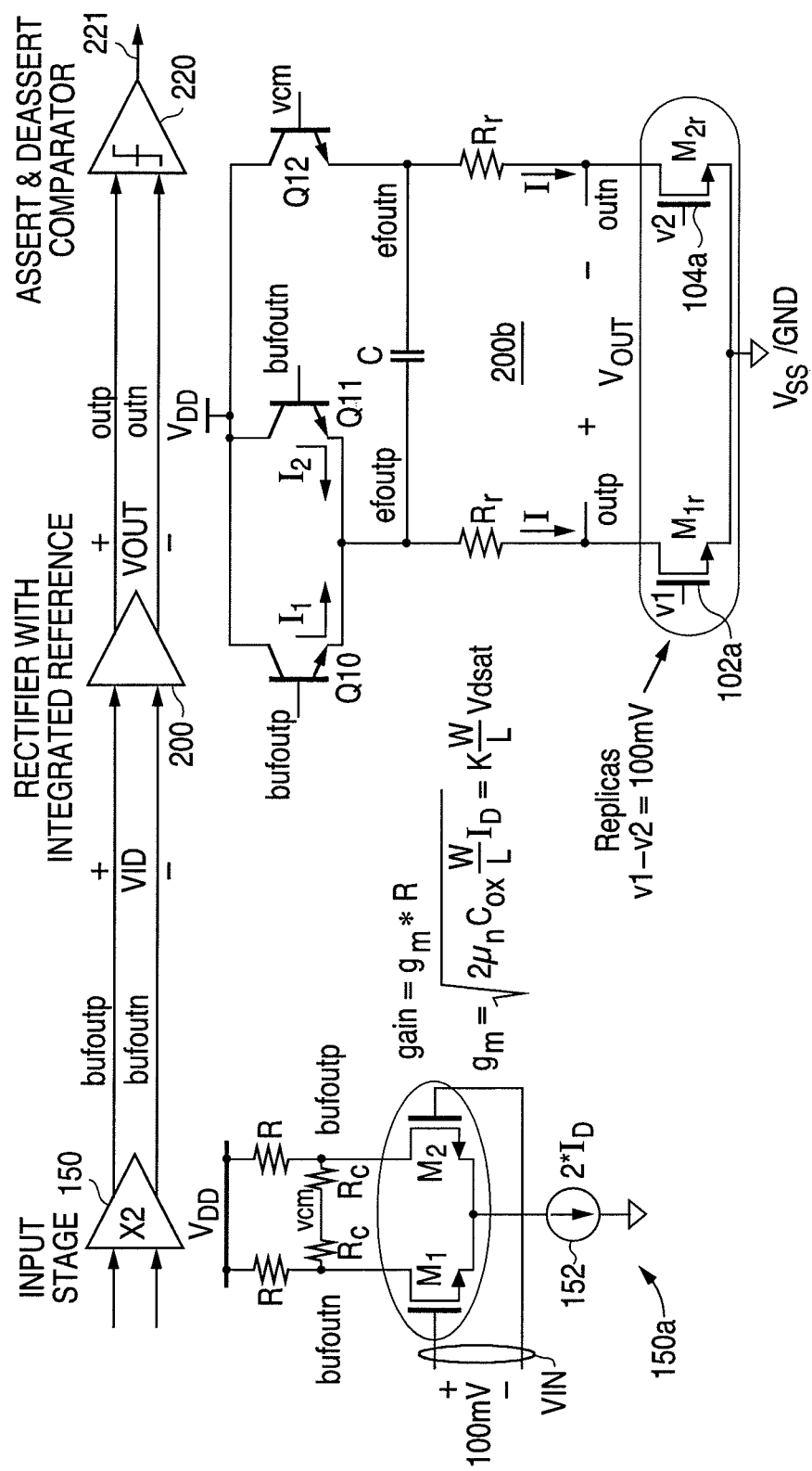
FIG. 6 is a schematic diagram of differential signal detection circuitry with an integrated reference voltage in accordance with another embodiment of the presently claimed invention, along with an exemplary embodiment of an input stage.

Referring to FIG. 6, compensation can be provided. As discussed above, an input stage 150 provides a buffered differential signal as the input signal for rectification by a rectification stage 200, which, in turn, provides the differential signal to the voltage comparator 220. An exemplary embodiment 150a as the input stage 150 includes N-type MOSFETs M1, M2 mutually connected as a differential amplifier biased by a tail current source 152 with load resistances R. Connecting two additional resistances RC between the output electrodes (where such resistances RC are significantly higher than the load resistances R) and tapping the voltage between such resistances RC provides the common mode voltage of the differential output voltage BUFOUTP–BUFOUTN at the output electrodes of the input stage 150a. This common mode voltage VCM controls the common mode transistor Q12 in the signal detection circuitry 200b.

As expressed by the equations, the input stage 150a has a signal gain equal to the product of the load resistance R and the transconductance GM of its transistors M1, M2. As is well known, transconductance GM and resistance vary over PVT. The internal reference voltage of the detection circuitry 200b should track these variations to minimize variations in the trip point over PVT. Accordingly, the current sources 102a, 104a used to provide the biasing current I for the amplifier transistors Q10, Q11 and common mode transistor Q12 are implemented using transistors M1R, M2R that are replicas of the input stage transistors M1, M2. This ensures that the transconductance GM in the detection circuitry 200b tracks the transconductance GM in the input stage 150a over PVT variations.

In accordance with an exemplary embodiment, the biasing voltages V1, V2 for these replica transistors M1R, M2R, their biasing currents I and reference resistances RR are designed such that when the input voltage VID is zero, the output voltage VOUT is less than the offset introduced by the internal reference voltage generator, and the comparator output 221 will be low. When the input voltage VIN to the input stage 150a reaches a value equal to the internal reference voltage, the output voltage VOUT (=OUTP–OUTN) becomes equal to zero and the comparator 220 trips, causing its output 221 to go high.

In summary, the input stage 150a is a differential amplifier with an NMOS transistor pair that provides a nominal gain of two. Accordingly, the output signal has an amplitude double that of the input signal VIN, i.e., bufoutp–bufoutn=2*VIN. The output signal bufoutp–bufoutn of this stage 150a is provided to rectification circuitry Q10,Q11,Q12,C within the detection circuitry 200b. The resulting signal has a magnitude half of that of the input signal, i.e., bufoutp–bufoutn)/2. The capacitor C holds the voltage at its peak amplitude. So the final output efoutp–efoutn is 2*(VIN/2)=VIN.

Referring to FIG. 7, detection circuitry 200c in accordance with another embodiment of the presently claimed invention includes additional replica transistors M3R, M4R connected in parallel with the serially connected reference resistances RR and replica current source transistors M1R, M2R. These additional transistors M3R, M4R have their gate electrodes biased by the biasing voltage of the opposite circuit branch. For example, the biasing current source transistor M1R of the amplifier circuit branch is biased by a first biasing voltage V1 while the current source transistor M2R of the voltage follower circuit branch is biased by a second biasing voltage V2. Meanwhile, the added transistor M3R in the amplifier circuit branch is also biased by the second biasing voltage V2, while the added transistor M4R across the voltage follower circuit branch is also biased by the first biasing voltage V1. As will be readily appreciated and indicated in the schematic diagram, this is to ensure that the amplifier Q10, Q11 and common mode Q12 transistors have the same total biasing current I1+I2.

These biasing voltages V1, V2 can be provided with a reference voltage bias circuit 160 formed by the serial connection of equal resistances R1, R2 and another replica transistor MR, biased by current provided from a current source 162, with the gate electrode of the transistor MR biased by the voltage between the reference resistances R1, R2. The voltage across the upper resistance R1 provides the first biasing voltage V1, while the voltage across the lower resistance R2 provides the second biasing voltage V2. (In accordance with an exemplary embodiment, the biasing current is 100 microamps and the resistances R1, R2 are selected to provide biasing voltages of 50 millivolts when conducting such current.) As a result, the reference voltage is provided by a circuit having gain variations over PVT variations similar to those of the input amplifier 150a (FIG. 6).

Figure 8:
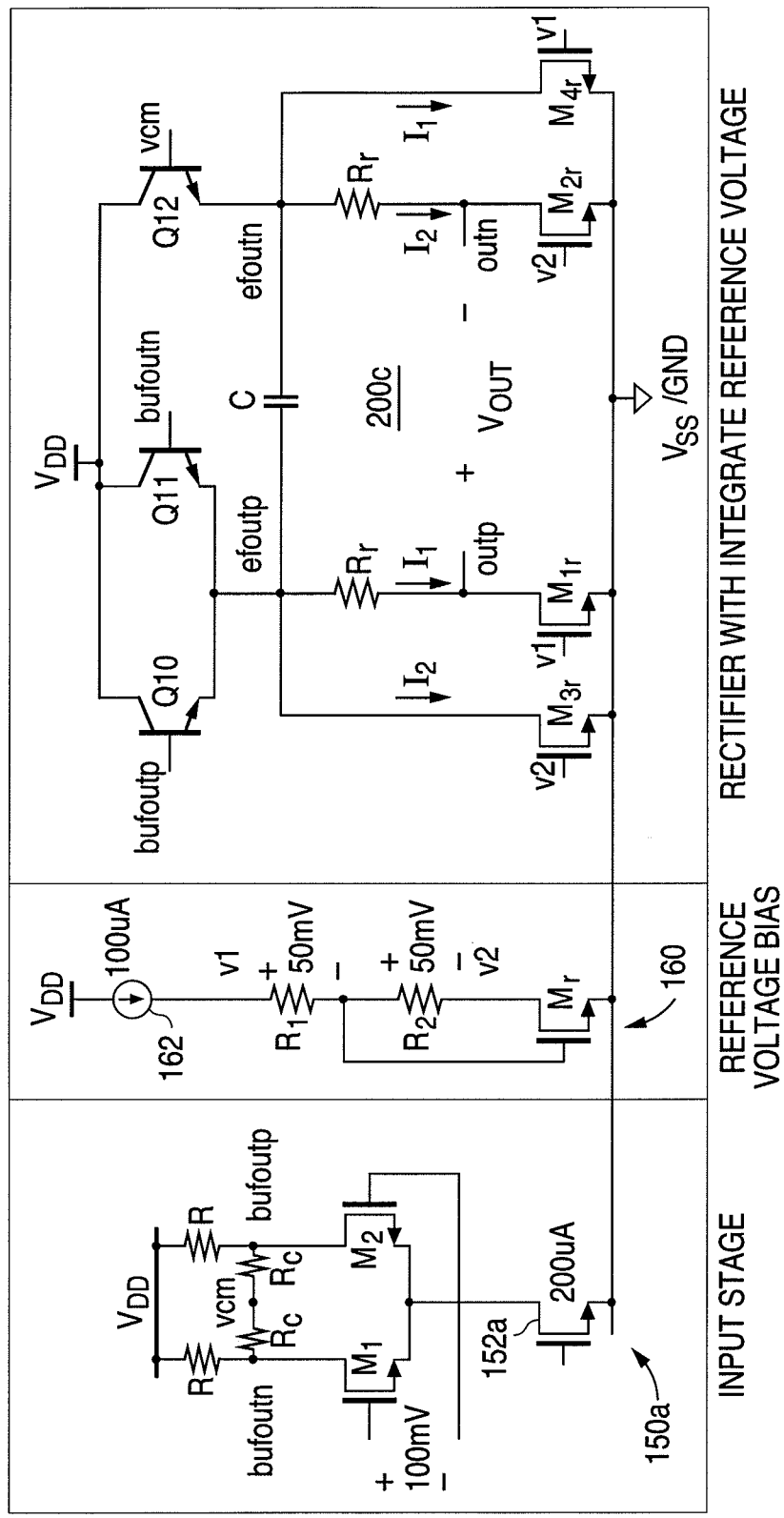
FIG. 8 is a schematic diagram depicting the circuitry of FIG. 7, an input stage and a biasing voltage stage.

Referring to FIG. 8, the input stage 150a, reference voltage bias stage 160 and detection circuitry 200c with the rectifier and integrated reference voltage are interconnected in accordance with the identified inter-stage signals.

Figure 9A:
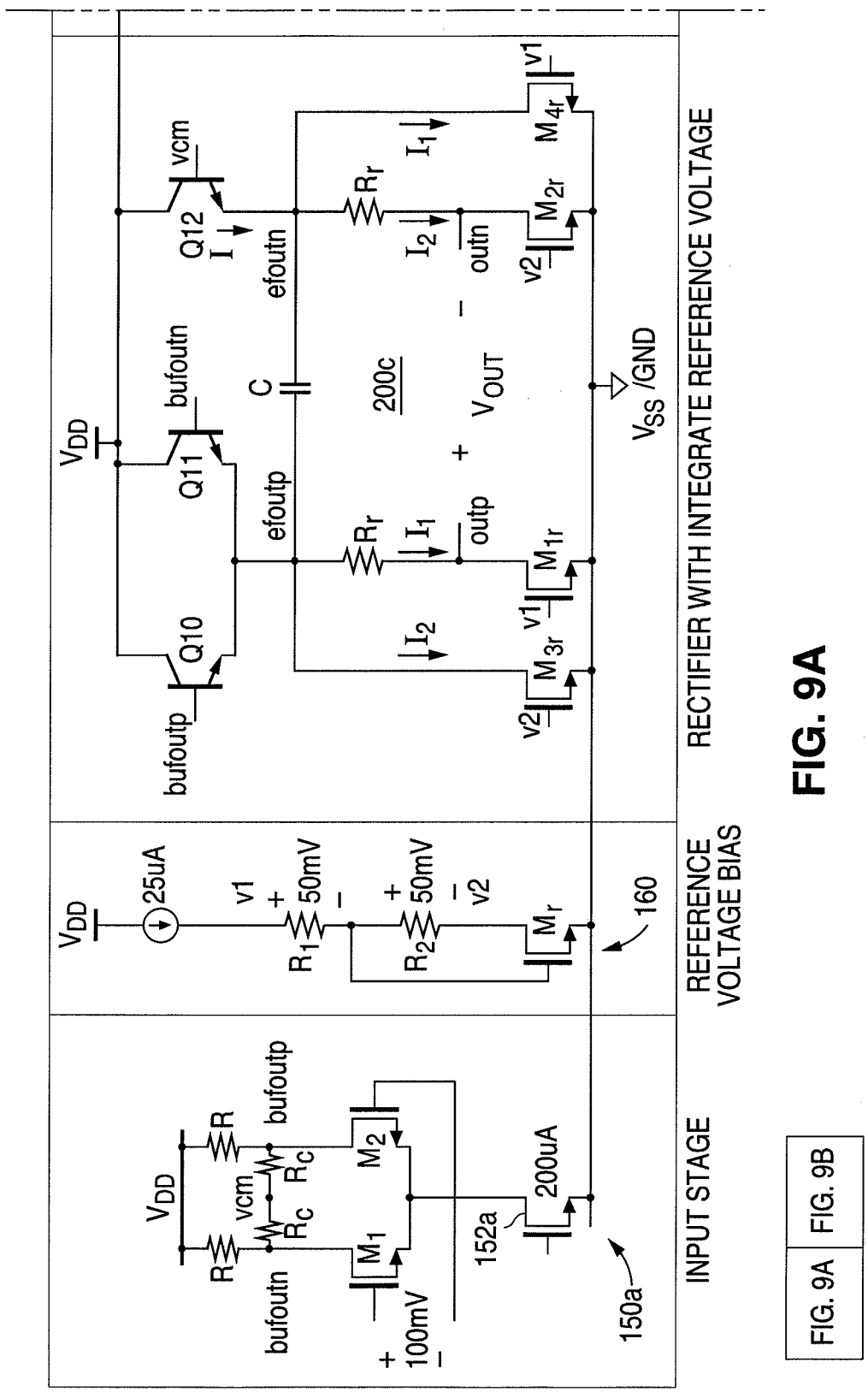
FIG. 9 is a schematic diagram of the circuitry of FIG. 9 plus circuitry for base current compensation.
Figure 9B:
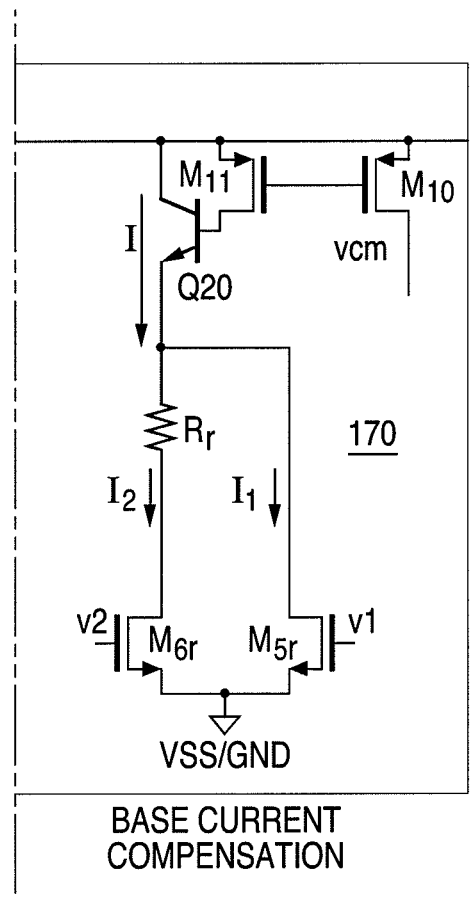

Referring to FIG. 9, additional compensation can be provided by compensating for PVT variations in the base current of the common mode transistor Q12. As discussed above, the common mode output voltage VCM of the input stage 150a is sensed by a pair of resistances RC across the output of the input stage 150a. While these sensing resistances RC are significantly larger than the load resistances R so as to not load the output of the input stage 150a, there is nonetheless some amount of base current flowing through these resistances RC, i.e., base current for the common mode transistor Q12. This base current increases at low transistor gain (current gain β of transistor Q12) and high temperature. This will introduce some variation in the sensed common mode voltage VCM over PVT variations and will translate to variation in the output voltage VOUT. This can be offset by using a replica circuit 170 in which a similar transistor Q20 conducts an equal current I (=I1+I2), which is provided by replica transistors M5R, M6R biased by the biasing voltages V1, V2, similar to the detection circuitry 200c. The resulting base current of this replica common mode transistor Q20 is mirrored by a current mirror circuit formed by transistors M10 and M11 to provide the base current needed by the original common mode transistor Q12. Accordingly, no base current for the common mode transistor Q12 is drawn from input stage 150a via its sensing resistances RC.

Figure 10:
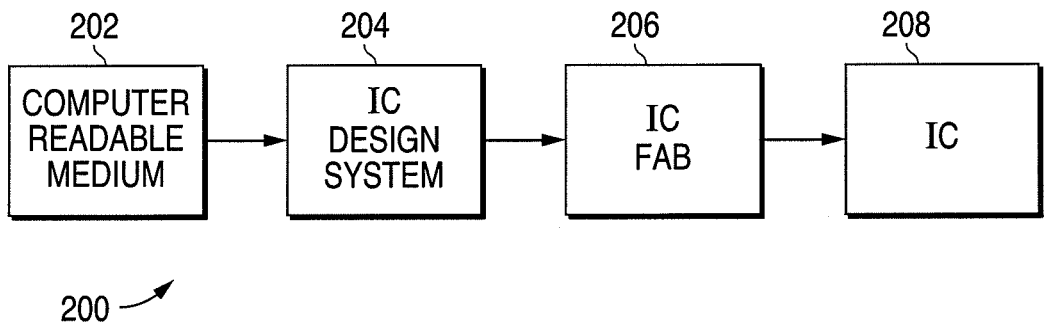
FIG. 10 is a functional block diagram of an exemplary embodiment of an integrated circuit design and fabrication system operated in accordance with computer instructions.

Referring to FIG. 10, integrated circuit (IC) design systems 204 (e.g., work stations or other forms of computers with digital processors) are known that create integrated circuits based on executable instructions stored on a computer readable medium 202, e.g., including memory such as but not limited to CD-ROM, DVD-ROM, other forms of ROM, RAM, hard drives, distributed memory, or any other suitable computer readable medium. The instructions may be represented by any programming language, including without limitation hardware descriptor language (HDL) or other suitable programming languages. The computer readable medium contains the executable instructions (e.g., computer code) that, when executed by the IC design system 204, cause an IC fabrication system 206 to produce an IC 208 that includes the devices or circuitry as set forth herein. Accordingly, the devices or circuits described herein may be produced as ICs 208 by such IC design systems 204 executing such instructions.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including differential signal detection circuitry with an integrated reference voltage, comprising:
   current source circuitry to provide at least first and second bias currents, including:
      a first current source circuit coupled to said differential amplifier circuitry and responsive to a first bias voltage by providing said first bias current; and
      a second current source circuit coupled to said voltage follower circuitry and responsive to a second bias voltage by providing said second bias current;
   differential amplifier circuitry coupled to at least said current source circuitry and responsive to at least said first bias current and a differential input signal having a differential input signal magnitude by providing a reference voltage and a first differential output signal phase; and
   voltage follower circuitry coupled to at least said current source circuitry and responsive to at least said second bias current and a third bias voltage by providing a second differential output signal phase;
   wherein said first and second differential output signal phases form a differential output signal having a differential output signal magnitude related to a difference between said differential input signal magnitude and said reference voltage.

2. The apparatus of claim 1, wherein said current source circuitry comprises:
   a first current source circuit coupled to said differential amplifier circuitry to provide said first bias current; and
   a second current source circuit coupled to said voltage follower circuitry to provide said second bias current.

3. The apparatus of claim 1, wherein:
   said current source circuitry is further to provide third and fourth bias currents;
   said differential amplifier circuitry is responsive to at least said first and third bias currents and said differential input signal by providing said reference voltage and said first differential output signal phase;
   said voltage follower circuitry is responsive to at least said second and fourth bias currents and said third bias voltage by providing said second differential output signal phase; and
   said current source circuitry comprises
      a first current source circuit coupled to said differential amplifier circuitry to provide said first bias current,
      a second current source circuit coupled to said voltage follower circuitry to provide said second bias current,
      a third current source circuit coupled to said differential amplifier circuitry to provide said third bias current, and
      a fourth current source circuit coupled to said voltage follower circuitry to provide said fourth bias current.

4. The apparatus of claim 3, wherein:
   said differential input signal includes first and second differential input signal phases:
   and
   said differential amplifier circuitry comprises
      at least one first transistor including at least one first input electrode to receive said first differential input signal phase, and at least one first output electrode to conduct a portion of a sum of said first and third bias currents, at least one second transistor including at least one second input electrode to receive said second differential input signal phase, and at least one second output electrode to conduct another portion of said sum of said first and third bias currents, at least one resistance coupled to said at least one first output electrode and said at least one second output electrode to conduct at least said first bias current and provide said reference voltage.

5. The apparatus of claim 3, wherein said voltage follower circuitry comprises:

at least one transistor including at least one input electrode to receive said third bias voltage, and at least one output electrode to conduct said at least said second and fourth bias currents; and at least one resistance coupled to said at least one output electrode to conduct at least said second bias current and provide said second differential output signal phase.

6. The apparatus of claim 1, wherein:

said current source circuitry is further to provide third and fourth bias currents;

said differential amplifier circuitry is responsive to at least said first and third bias currents and said differential input signal by providing said reference voltage and said first differential output signal phase;

said voltage follower circuitry is responsive to at least said second and fourth bias currents and said third bias voltage by providing said second differential output signal phase; and said current source circuitry comprises a first current source circuit coupled to said differential amplifier circuitry and responsive to a first bias voltage by providing said first bias current, a second current source circuit coupled to said voltage follower circuitry and responsive to a second bias voltage by providing said second bias current, a third current source circuit coupled to said differential amplifier circuitry and responsive to said second bias voltage by providing said third bias current, and a fourth current source circuit coupled to said voltage follower circuitry and responsive to said first bias voltage by providing said fourth bias current.

7. The apparatus of claim 6 wherein:

said differential input signal includes first and second differential input signal phases;

and said differential amplifier circuitry comprises at least one first transistor including at least one first input electrode to receive said first differential input signal phase, and at least one first output electrode to conduct a portion of a sum of said first and third bias currents, at least one second transistor including at least one second input electrode to receive said second differential input signal phase, and at least one second output electrode to conduct another portion of said sum of said first and third bias currents, at least one resistance coupled to said at least one first output electrode and said at least one second output electrode to conduct at least said first bias current and provide said reference voltage.

8. The apparatus of claim 6, wherein said voltage follower circuitry comprises:

at least one transistor including at least one input electrode to receive said third bias voltage, and at least one output electrode to conduct said at least said second and fourth bias currents; and at least one resistance coupled to said at least one output electrode to conduct at least said second bias current and provide said second differential output signal phase.

9. The apparatus of claim 1 wherein:

said differential input signal includes first and second differential input signal phases; and said differential amplifier circuitry comprises at least one first transistor including at least one first input electrode to receive said first differential input signal phase, and at least one first output electrode, at least one second transistor including at least one second input electrode to receive said second differential input signal phase, and at least one second output electrode, at least one resistance coupled to said at least one first output electrode and said at least one second output electrode to provide said reference voltage.

10. The apparatus of claim 1, wherein said voltage follower circuitry comprises at least one transistor including at least one input electrode to receive said third bias voltage, and at least one output electrode to conduct said at least said second bias current and provide said second differential output signal phase.

11. The apparatus of claim 1, wherein said voltage follower circuitry comprises:

at least one transistor including at least one input electrode to receive said third bias voltage, and at least one output electrode to conduct said at least said second bias current; and at least one resistance coupled to said at least one output electrode to provide said second differential output signal phase.

12. A method of detecting a differential signal detection circuitry with an integrated reference voltage comprising:

generating at least first and second bias currents by:
responding to a first bias voltage by generating said first bias current; and
responding to a second bias voltage by generating said second bias current;

responding to at least said first bias current and a differential input signal having a differential input signal magnitude by generating a reference voltage and a first differential output signal phase; and responding to at least said second bias current and a third bias voltage by generating a second differential output signal phase;

wherein said first and second differential output signal phases form a differential output signal having a differential output signal magnitude related to a difference between said differential input signal magnitude and said reference voltage.

13. The method of claim 12, wherein:

said generating at least first and second bias currents comprises generating at least first, second, third and fourth bias currents;

said responding to at least said first bias current and a differential input signal having a differential input signal magnitude by generating a reference voltage and a first differential output signal phase comprises responding to at least said first and third bias currents and said differential input signal by generating said reference voltage and said first differential output signal phase; and said responding to at least said second bias current and a third bias voltage by generating a second differential output signal phase comprises responding to at least said second and fourth bias currents and said third bias voltage by generating said second differential output signal phase.

14. The method of claim 12, wherein:

said generating at least first and second bias currents comprises responding to a first bias voltage by generating said first bias current, responding to a second bias voltage by generating said second bias current, responding to said second bias voltage by generating a third bias current, and responding to said first bias voltage by generating a fourth bias current;

said responding to at least said first bias current and a differential input signal having a differential input signal magnitude by generating a reference voltage and a first differential output signal phase comprises responding to at least said first and third bias currents and said differential input signal by generating said reference voltage and said first differential output signal phase; and said responding to at least said second bias current and a third bias voltage by generating a second differential output signal phase comprises responding to at least said second and fourth bias currents and said third bias voltage by generating said second differential output signal phase.

* * * * *